(12) United States Patent
Ban et al.

(10) Patent No.: US 12,505,660 B2
(45) Date of Patent: Dec. 23, 2025

(54) IMAGE PROCESSING METHOD AND APPARATUS USING CONVOLUTIONAL NEURAL NETWORK

(71) Applicant: Samsung Electronics Co., Ltd., Suwon-si (KR)

(72) Inventors: Daehyun Ban, Suwon-si (KR); Daehun Kim, Suwon-si (KR); Yongsung Kim, Suwon-si (KR); Dongwan Lee, Suwon-si (KR); Juyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 18/068,209

(22) Filed: Dec. 19, 2022

(65) Prior Publication Data
US 2023/0206617 A1    Jun. 29, 2023

Related U.S. Application Data

(63) Continuation of application No. PCT/KR2022/020480, filed on Dec. 15, 2022.

(30) Foreign Application Priority Data

Dec. 29, 2021  (KR) .................. 10-2021-0191654
Sep. 8, 2022   (KR) .................. 10-2022-0114460

(51) Int. Cl.
*G06V 10/82*    (2022.01)
*G06T 5/20*     (2006.01)
(Continued)

(52) U.S. Cl.
CPC ............... *G06V 10/82* (2022.01); *G06T 5/20* (2013.01); *G06T 7/50* (2017.01); *G06T 7/70* (2017.01); *G06V 10/764* (2022.01); *H04N 19/59* (2014.11)

(58) Field of Classification Search
CPC .. G06V 10/82; G06V 10/764; G06V 10/7715; G06T 5/20; G06T 7/50;
(Continued)

(56) References Cited

U.S. PATENT DOCUMENTS 9,914,213 B2     3/2018  Vijayanarasimhan et al.
10,043,113 B1 *  8/2018  Kim ......................... G06T 5/20
                         (Continued)

FOREIGN PATENT DOCUMENTS

CN    110991354 A    4/2020
CN    112733848 A    4/2021
(Continued)

OTHER PUBLICATIONS

International Search Report dated Mar. 16, 2023, issued in International Patent Application No. PCT/KR2022/020480.

*Primary Examiner* — Henok Shiferaw
*Assistant Examiner* — Woo C Rhim
(74) *Attorney, Agent, or Firm* — Jefferson IP Law, LLP (57) ABSTRACT

An apparatus is provided. The apparatus includes an input/output interface configured to receive an image and output a result, a memory storing one or more instructions for processing the image by using a convolutional neural network, and a processor configured to process the image by executing the one or more instructions, wherein the convolutional neural network (CNN) may include one or more spatial transformation modules, and the spatial transformation module may include a spatial transformer configured to apply a spatial transform to first input data that is the image or an output of a previous spatial transformation module, by using a spatial transformation function, a first convolutional layer configured to perform a convolution operation between the first input data to which the spatial transform is applied and a first filter, and a spatial inverse transformer configured
(Continued)

to apply a spatial inverse transform to an output of the first convolutional layer.

18 Claims, 10 Drawing Sheets

(51) Int. Cl.
  *G06T 7/50* (2017.01)
  *G06T 7/70* (2017.01)
  *G06V 10/764* (2022.01)
  *H04N 19/59* (2014.01)
(58) Field of Classification Search
  CPC .......... G06T 7/70; H04N 19/59; H04N 19/60; G06N 3/0464
  See application file for complete search history.

(56) References Cited

U.S. PATENT DOCUMENTS

| | | | | |
|---|---|---|---|---|
| 10,089,556 | B1* | 10/2018 | Xu | G06V 10/806 |
| 11,095,887 | B2* | 8/2021 | Kim | G06N 3/084 |
| 11,593,614 | B2* | 2/2023 | Chollet | G06N 3/0464 |
| 11,734,572 | B2* | 8/2023 | Jaderberg | G06N 3/084 382/157 |
| 2016/0358038 | A1* | 12/2016 | Jaderberg | G06N 3/084 |
| 2018/0211109 | A1* | 7/2018 | Wang | G06V 30/416 |
| 2019/0035117 | A1* | 1/2019 | Xing | G06T 5/70 |
| 2019/0130574 | A1* | 5/2019 | Li | G06N 3/02 |
| 2020/0151309 | A1* | 5/2020 | Thuillier | G06V 10/82 |
| 2020/0213587 | A1* | 7/2020 | Galpin | H04N 19/176 |
| 2020/0250415 | A1* | 8/2020 | Torres | G06V 10/82 |
| 2020/0250520 | A1* | 8/2020 | Ross | G06F 17/153 |
| 2020/0364515 | A1* | 11/2020 | Heide | G06N 3/084 |
| 2021/0049781 | A1* | 2/2021 | Anisimovskiy | G06T 3/4007 |
| 2021/0090226 | A1* | 3/2021 | Rauniyar | G06T 3/14 |
| 2021/0329286 | A1* | 10/2021 | Wang | G06N 3/045 |
| 2021/0344916 | A1* | 11/2021 | Kim | G06N 3/084 |
| 2021/0365779 | A1* | 11/2021 | Oh | G06N 3/08 |
| 2021/0374528 | A1* | 12/2021 | Okuno | G06V 10/7715 |
| 2022/0101626 | A1* | 3/2022 | Lenga | G06V 10/776 |
| 2022/0335276 | A1* | 10/2022 | Yamakaji | G06N 3/048 |
| 2023/0056564 | A1* | 2/2023 | Han | G06T 5/70 |
| 2023/0154157 | A1* | 5/2023 | Ehteshami Bejnordi | G06V 10/464 382/156 |
| 2023/0206617 | A1* | 6/2023 | Ban | G06V 10/7715 382/156 |
| 2023/0298324 | A1* | 9/2023 | Qin | G06N 3/08 382/159 |

FOREIGN PATENT DOCUMENTS

| | | | | |
|---|---|---|---|---|
| JP | 6605669 | B2 | 11/2019 | |
| JP | 2021056735 | A * | 4/2021 | |
| KR | 10-2019-0039458 | A | 4/2019 | |
| KR | 10-2021-0050168 | A | 5/2021 | |
| KR | 10-2021-0143093 | A | 11/2021 | |
| WO | WO-2021211966 | A1 * | 10/2021 | G06N 3/045 |

* cited by examiner

IMAGE PROCESSING METHOD AND APPARATUS USING CONVOLUTIONAL NEURAL NETWORK

CROSS-REFERENCE TO RELATED APPLICATION(S)

This application is a continuation application, claiming priority under § 365 (c), of an International application No. PCT/KR2022/020480, filed on Dec. 15, 2022, which is based on and claims the benefit of a Korean patent application number 10-2021-0191654, filed on Dec. 29, 2021, in the Korean Intellectual Property Office, and of a Korean patent application number 10-2022-0114460, filed on Sep. 8, 2022, in the Korean Intellectual Property Office, the disclosure of each of which is incorporated by reference herein in its entirety.

TECHNICAL FIELD

The disclosure relates to an image processing method using a convolutional neural network (CNN), and an apparatus performing the same.

BACKGROUND ART

A convolutional neural network (CNN) is widely used to perform image processing, for example, classification, detection, segmentation, and depth estimation.

Generally, a CNN includes a convolutional layer, a pooling layer, and an output layer. In the convolutional layer, a convolution operation is performed between an output of a previous layer (or, when the convolutional layer is a first layer, an input image) and a filter (or a kernel). The pooling layer that is mostly located as a next layer of the convolutional layer performs sub sampling on an output of the convolutional layer. The output layer calculates an image processing result by using data that has passed through the convolutional layer and the pooling layer, and may be configured as a fully-connected layer or a convolutional layer as occasion demands.

The number and/or order of layers in the CNN may vary depending on a design intention and/or application. For example, when C, P, and O respectively denote the convolutional layer, the pooling layer, and the output layer, LeNet may include "C—P—C—P—O," and AlexNet may include "C—P—C—P—C—C—C—P—O." In LeNet and AlexNet, the output layer includes three fully-connected layers. As in the examples of LeNet and AlexNet, it is not necessary for the pooling layer to be present after all convolutional layers.

A trained filter of the CNN has directivity. In other words, an image processing result may change when a same image is input to the CNN in a different direction. For example, when a same image is input to a CNN, which is trained to classify an image on which a number 9 is written into 9, after the image being rotated 45°, there is a possibility that the CNN may classify the image into another number (for example, 4).

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Solution to Problem

Aspects of the disclosure are to address at least the above-mentioned problems and/or disadvantages and to provide at least the advantages described below. Accordingly, an aspect of the disclosure is to provide an image processing method using a convolutional neural network (CNN), and an apparatus performing the same.

Additional aspects will be set forth in part in the description which follows and, in part, will be apparent from the description, or may be learned by practice of the presented embodiments.

In accordance with an aspect of the disclosure, an image processing apparatus using a convolutional neural network is provided. The image processing apparatus includes an input/output interface configured to receive an image and output a processing result for the image, a memory storing one or more instructions for processing the image by using the convolutional neural network, and a processor configured to process the image by executing the one or more instructions, wherein the convolutional neural network may include one or more spatial transformation modules.

According to an embodiment of the disclosure, each of the one or more spatial transformation module includes a spatial transformer configured to apply a spatial transform to first input data that is the image or an output of a previous spatial transformation module, by using a spatial transformation function.

According to an embodiment of the disclosure, each of the one or more spatial transformation module includes a first convolutional layer configured to perform a convolution operation between the first input data to which the spatial transform is applied and a first filter.

According to an embodiment of the disclosure, each of the one or more spatial transformation module includes a spatial inverse transformer configured to apply a spatial inverse transform to an output of the first convolutional layer by using a spatial inverse transformation function.

In accordance with an aspect of the disclosure, an image processing method using a convolutional neural network including one or more spatial transformation modules is provided. The image processing method includes, by a first spatial transformation module among the one or more spatial transformation modules, applying a spatial transform to first input data that is an image or an output of a previous spatial transformation module, by using a first spatial transformation function.

According to an embodiment of the disclosure, the image processing method includes performing a convolution operation between the first input data to which the spatial transform is applied and a first filter.

According to an embodiment of the disclosure, the image processing method includes applying a spatial inverse transform to a result of the convolution operation by using a first spatial inverse transformation function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of the disclosure will be more apparent from the following description taken in conjunction with the accompanying drawings, in which.

The same reference numerals are used to represent the same elements throughout the drawings.

MODE OF DISCLOSURE

The following description with reference to the accompanying drawings is provided to assist in a comprehensive understanding of the disclosure as defined by the claims and their equivalents. It includes various specific details to assist in that understanding but these are to be regarded as merely exemplary. Accordingly, those of ordinary skill in the art will recognize that various changes and modifications of the disclosure described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be understood based on the meaning of the terms together with the description throughout the specification.

While such terms as "first," "second," etc., may be used to describe various components, such components are not limited to the above terms. The above terms are used only to distinguish one component from another. For example, a first component may be referred to as a second component, and similarly, a second component may be referred to as a first component.

When a component is "connected" or "accessed" to another component, the component may be directly connected or accessed to the other component, but it may also be understood that there may be an intervening component therebetween. On the other hand, when a component is "directly connected" or "directly accessed" to another component, it may be understood that there is no intervening component therebetween.

Terms used herein, including technical or scientific terms, may have the same meaning as commonly understood by one of ordinary skill in the art described in the disclosure.

In the disclosure, it is to be understood that terms such as "including" or "having," etc., are intended to indicate the existence of the features, numbers, operations, actions, components, parts, or combinations thereof described in the disclosure, and are not intended to preclude the possibility that one or more other features, numbers, operations, actions, components, parts, or combinations thereof may exist or may be added.

Terms used in the disclosure may be defined or understood as below.

In the disclosure, an "image" may include static visual data (e.g., a photograph) and dynamic visual data (e.g., a moving image). In other words, an embodiment of the disclosure may be applied to static visual data or dynamic visual data.

In the disclosure, "processing" of an image may include at least one of classification, detection, segmentation, or depth estimation performed on the image. For example, it may be understood that the processing of an image may include classifying which one of a plurality of pre-determined classes the image corresponds to. For example, it may be understood that the processing of an image includes detecting a location and type of an object included in the image. For example, it may be understood that the processing of an image includes segmenting an object included in the image at a pixel level. For example, it may be understood that the processing of an image includes estimating a depth (e.g., a distance) of an object included in the image.

In the disclosure, "input data" may be an input for each module or each layer included in a convolutional neural network (CNN). For example, it may be understood that input data for a first module or layer included in a CNN is a pre-processed image. For example, it may be understood that input data for an Nth module or layer (N≠1) included in a CNN is an output of an Nth−1 layer.

Figure 1:
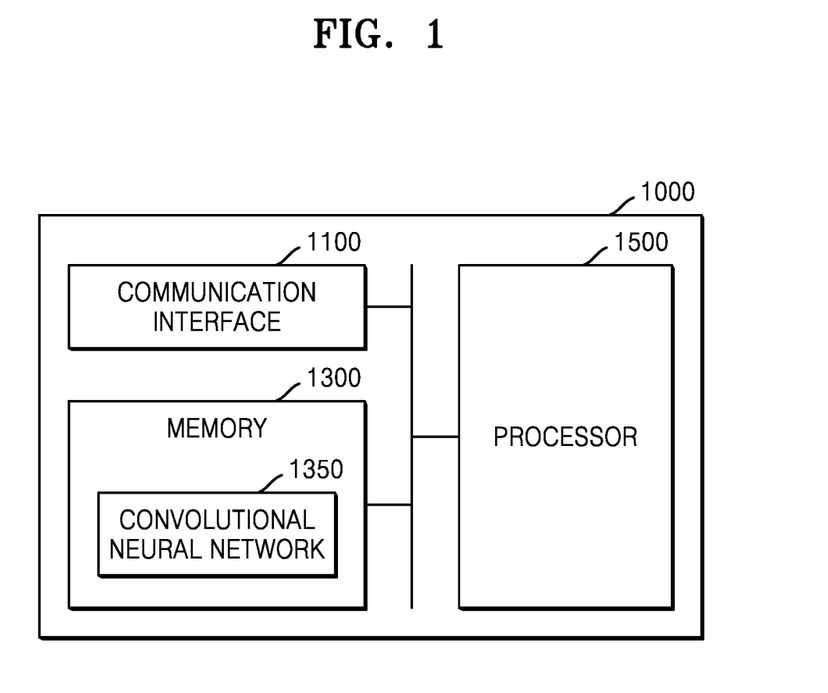
FIG. 1 is a block diagram of an image processing apparatus according to an embodiment of the disclosure.

FIG. 1 is a block diagram of an image processing apparatus according to an embodiment of the disclosure.

Referring to FIG. 1, the image processing apparatus 1000 according to an embodiment of the disclosure may include an input/output interface 1100, a memory 1300, and a processor 1500.

The input/output interface 1100 may receive an image and output a processing result of the image.

The memory 1300 may store one or more instructions for processing the image by using a CNN 1350.

For example, the memory 1300 may include at least one of a flash memory type, a hard disk type, a multimedia card micro type, a card type memory (for example, a secure digital (SD) or an extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, or an optical disk, but is not limited thereto.

The processor 1500 may execute the one or more instructions stored in the memory 1300 to process an image.

For example, the processor 1500 may be configured of at least one of, for example, a central processing unit (CPU), a micro-processor, a graphics processing unit (GPU), an application specific integrated circuit (ASIC), a digital signal processor (DSP), a digital signal processing device (DSPD), a programmable logic device (PLD), a field programmable gate array (FPGA), an application processor (AP), a neural processing unit, or an artificial intelligence-dedicated processor designed in a hardware structure specialized for processing of an artificial intelligence model, but is not limited thereto.

Figure 2:
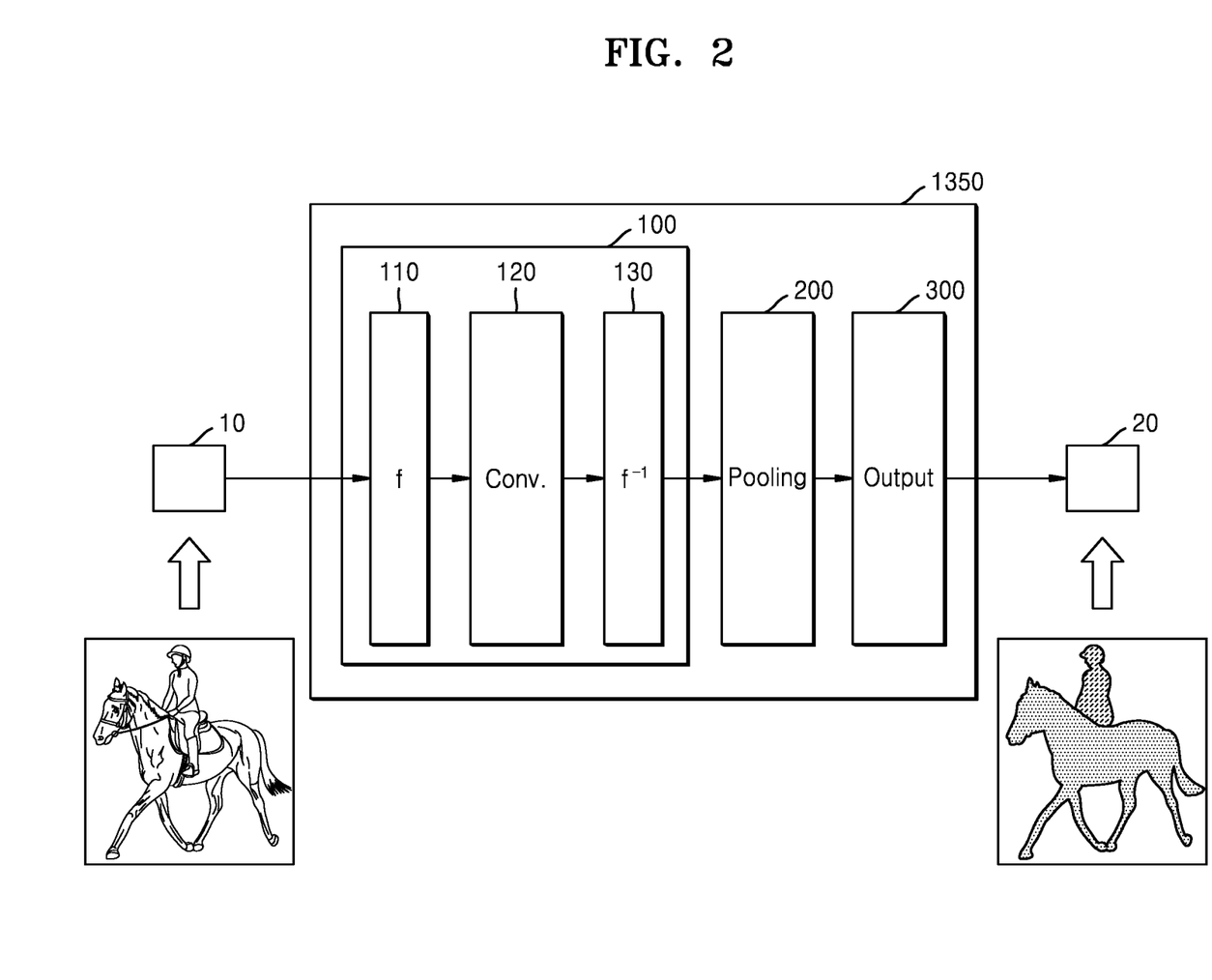
FIG. 2 illustrates a convolutional neural network (CNN) according to an embodiment of the disclosure.

FIG. 2 illustrates a CNN according to an embodiment of the disclosure.

Referring to FIG. 2, the CNN 1350 according to an embodiment of the disclosure may receive an image 10 and output a processing result 20 of the image. For example, the CNN 1350 may receive an image of a person riding a horse, and output a result of segmenting a person and a horse (in units of pixels).

According to an embodiment of the disclosure, the CNN 1350 may include one or more spatial transformation modules 100. The spatial transformation module 100 may perform a pre-determined operation on input data that is the image 10 or an output of a previous spatial transformation module. For example, a first spatial transformation module included in the CNN 1350 may perform a pre-determined operation on the (preprocessed) image 10, and an Nth spatial transformation module (N≠1) included in the CNN 1350 may perform a pre-determined operation on an output of the Nth−1 spatial transformation module.

According to an embodiment of the disclosure, the spatial transformation module 100 may include a spatial transformer 110 configured to apply a spatial transform to the input data that is the image 10 or an output of a previous spatial transformation module, by using a spatial transformation function f. For example, the spatial transformer 110 may transform spatial mapping of the input data by using the spatial transformation function f.

According to an embodiment of the disclosure, the spatial transformation function f may be a reversible function. The spatial transformation function f being reversible may indicate that a result of transforming the input data has a same form as original input data. Accordingly, whether the spatial transformation function f is reversible may be determined according to a form of the input data.

For example, when the input data is in a form of a square, a function that rotates the input data by 90° is the reversible function, and a function that rotates the input data by 45° is an unreversible function. As another example, when the input data is in a form of a rectangle, a function that rotates the input data by 90° is an unreversible function, and a function that rotates the input data by 180° is a reversible function.

For example, the spatial transformation function f may be a permutation function that switches a length and a width of the input data.

For example, the spatial transformation function f may be a rotation function that rotates the input data by a pre-determined angle. As described above, the pre-determined angle may be determined according to a form of the input data within a reversible range.

For example, the spatial transformation function f may be a flip function that flips left and right or up and down of the input data.

For example, the spatial transformation function f may be a scale function that enlarges or reduces a size of the input data.

Hereinabove, four types of functions have been described as examples, but the spatial transformation function f is not limited thereto, and any function reversible with respect to the input data may be used as the spatial transformation function f. Some examples of the spatial transformation function f will be additionally described below with reference to FIGS. 3A to 3D.

Even when a spatial transformation function that is not reversible is applied, an application (e.g., classification) that does not require processing in units of pixels may successfully operate. For example, a CNN that learnt "a label is the same even when a space is changed" by using an image spatially transformed by an unreversible spatial transformation function (e.g., a function that rotates an image by 45° counterclockwise) may classify an image on which a number 9 is written and rotated by 45°, into 9.

However, when an unreversible spatial transformation function is applied, an application (e.g., detection, segmentation, or depth estimation) that requires processing in units of pixels may not successfully operate. When a spatial transformation function is unreversible, a form of an image changes before and after spatial transformation, and space information is not preserved. In other words, when the spatial transformation function is unreversible, spatial mapping of the image is transformed by spatial transformation, and thus the CNN is unable to successfully perform processing in units of pixels.

According to an embodiment of the disclosure, the spatial transformation module 100 may include a convolutional layer 120 configured to perform a convolution operation between input data to which the spatial transform is applied and a filter. For example, the convolutional layer 120 may calculate a pixel value of an output (i.e., a feature map) mapped to a first region (e.g., an upper left region) of the input data to which the spatial transform is applied by multiplying pixel values corresponding to the first region by parameter values included in the filter and then adding results thereof, and calculate a pixel value of an output mapped to a second region (e.g., a region moved by one pixel to right from the first region) of the input data to which the spatial transform is applied by multiplying pixel values corresponding to the second region by the parameter values included in the filter and then adding results thereof.

In the same manner, the convolutional layer 120 may perform a convolution operation by multiplying the parameter values included in the filter by the pixel values of the input data to which the spatial transform is applied and adding results thereof, while sliding the input data by one pixel each from left to right and from top to bottom.

According to an embodiment of the disclosure, the spatial transformation module 100 may include a spatial inverse transformer 130 configured to apply a spatial inverse transform to an output of the convolutional layer 120 by using a spatial inverse transformation function f−1. The spatial inverse transformation function f−1 may be a reverse function of the spatial transformation function f. The spatial inverse transformer 130 may perform operations of the spatial transformer 110 in reverse.

The spatial transformer 110 and the spatial inverse transformer 130 are included in the CNN 1350 and operate before and after the convolutional layer 120, and thus have different concepts from data augmentation that applies a spatial transform to an input portion of a neural network model. According to an embodiment of the disclosure, the CNN 1350 includes the spatial transformer 110 and the spatial inverse transformer 130, and thus the filter of the convolutional layer 120 may learn spatially transformed images not in a single direction, but in various directions, have stronger robustness against rotation of an image than data augmentation or spatial transformer of the related art, and have a higher image processing speed.

According to an embodiment of the disclosure, the CNN 1350 may include at least one pooling layer 200 configured to perform sub sampling on an output of a previous layer. The pooling layer 200 may reduce a size of an output of a previous layer by performing max pooling or average pooling on the output of the previous layer. The max pooling may include extracting, from the output of the previous layer, a maximum value among pixel values included in a range of a size of a filter of the pooling layer 200. The average pooling may include extracting, from the output of the previous layer, an average value of the pixel values included in the range of the size of the filter of the pooling layer 200.

According to an embodiment of the disclosure, the number of pooling layers 200 may be equal to or less than the number of spatial transformation modules 100. In other words, pooling is not always required after all convolution operations, and the number and locations of the pooling layers 200 may vary depending on an application.

According to an embodiment of the disclosure, the CNN 1350 may further include an output layer 300 configured to calculate a processing result for the image by using an output of a previous layer. For example, the output layer 300 may calculate to which class from among a plurality of predetermined classes the image 10 corresponds. For example, the output layer 300 may calculate a location and type of an object included in the image 10. For example, the output layer 300 may calculate a result of segmenting the image 10 in a pixel level. For example, the output layer 300 may calculate a depth of the object included in the image 10. The output layer 300 may be configured as a fully-connected layer or convolution layer depending on an application.

FIGS. 3A, 3B, 3C, and 3D are conceptual diagrams for describing an operation of a spatial transformation function, according to the disclosure.

Figure 3A:
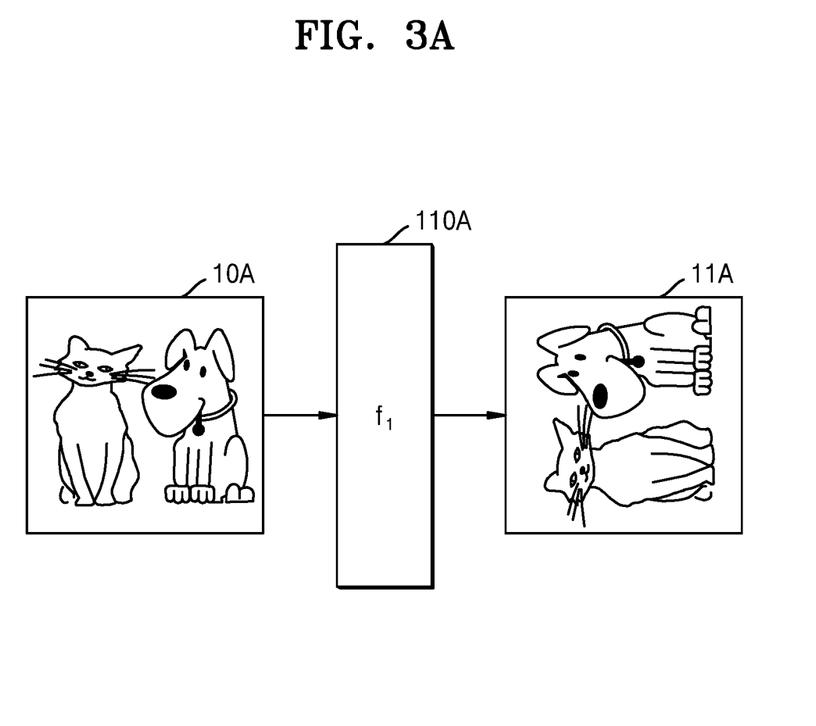
FIG. 3A is a conceptual diagram for describing an operation of a spatial transformation function, according to an embodiment of the disclosure.

Referring to FIG. 3A, a spatial transformer 110A may apply, to an image 10A by using a spatial transformation function f1, spatial transformation of rotating the image 10A by 90° counterclockwise or spatial transformation of transposing the image 10A. Because the image 10A is in a form of a square, the spatial transformation function f1 is a reversible function regarding the image 10A. Accordingly, when an image 11A spatially transformed by the spatial transformation function f1 is reversed, the image 10A may be restored, and pixel unit information of the image 10A is not lost during the reverse.

Figure 3B:
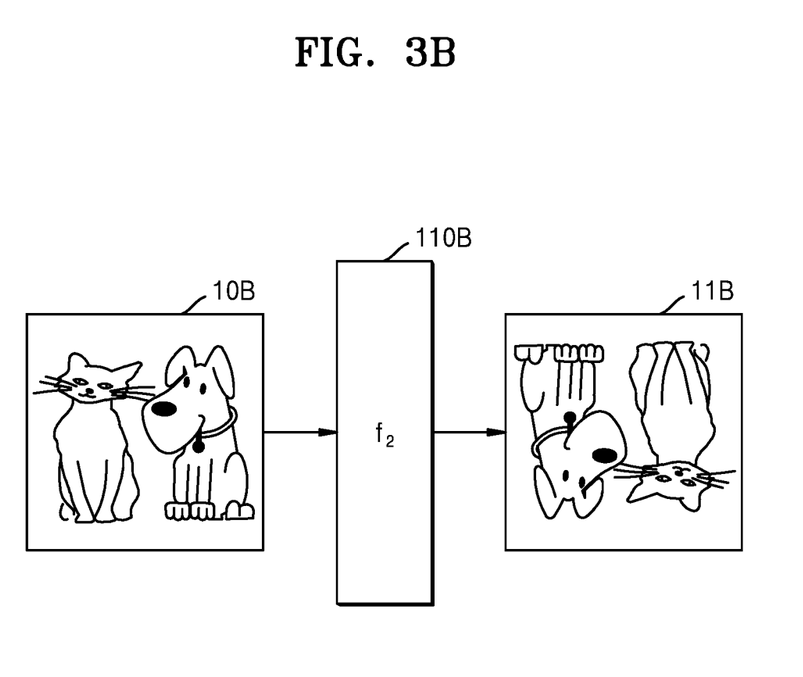
FIG. 3B is a conceptual diagram for describing an operation of a spatial transformation function, according to an embodiment of the disclosure.

Referring to FIG. 3B, a spatial transformer 110B may apply, to an image 10B by using a spatial transformation function f2, spatial transformation of rotating the image 10B by 180° counterclockwise. Because the image 10B is in a form of a square, the spatial transformation function f2 is a reversible function regarding the image 10B. Accordingly, when an image 11B spatially transformed by the spatial transformation function f2 is reversed, the image 10B may be restored, and pixel unit information of the image 10B is not lost during the reverse.

Figure 3C:
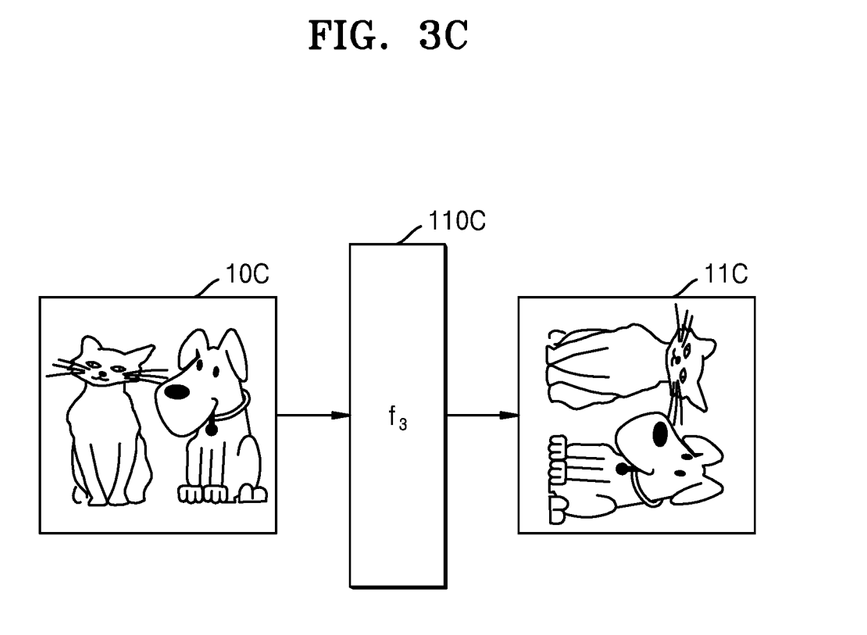
FIG. 3C is a conceptual diagram for describing an operation of a spatial transformation function, according to an embodiment of the disclosure.

Referring to FIG. 3C, a spatial transformer 110C may apply, to an image 10C by using a spatial transformation function f3, spatial transformation of rotating the image 10C by 270° counterclockwise. Because the image 10C is in a form of a square, the spatial transformation function f3 is a reversible function regarding the image 10C. Accordingly, when an image 11C spatially transformed by the spatial transformation function f3 is reversed, the image 10C may be restored, and pixel unit information of the image 10C is not lost during the reverse.

Figure 3D:
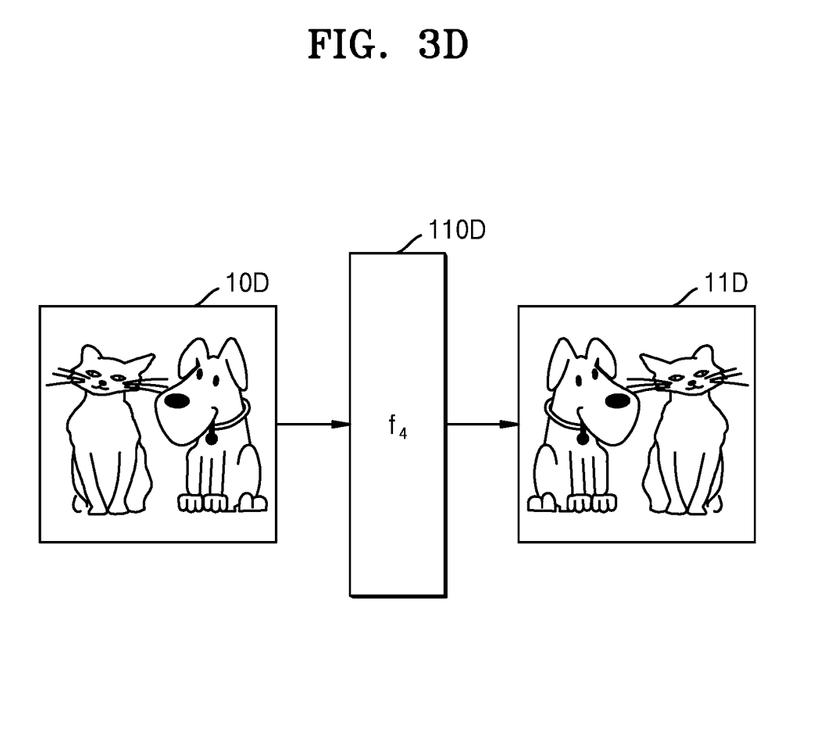
FIG. 3D is a conceptual diagram for describing an operation of a spatial transformation function, according to an embodiment of the disclosure.

Referring to FIG. 3D, a spatial transformer 110D may apply, to an image 10D by using a spatial transformation function f4, spatial transformation of flipping left and right of the image 10D. Because the image 10D is in a form of a square, the spatial transformation function f4 is a reversible function regarding the image 10D. Accordingly, when an image 11D spatially transformed by the spatial transformation function f4 is reversed, the image 10D may be restored, and pixel unit information of the image 10D is not lost during the reverse.

Figure 4A:
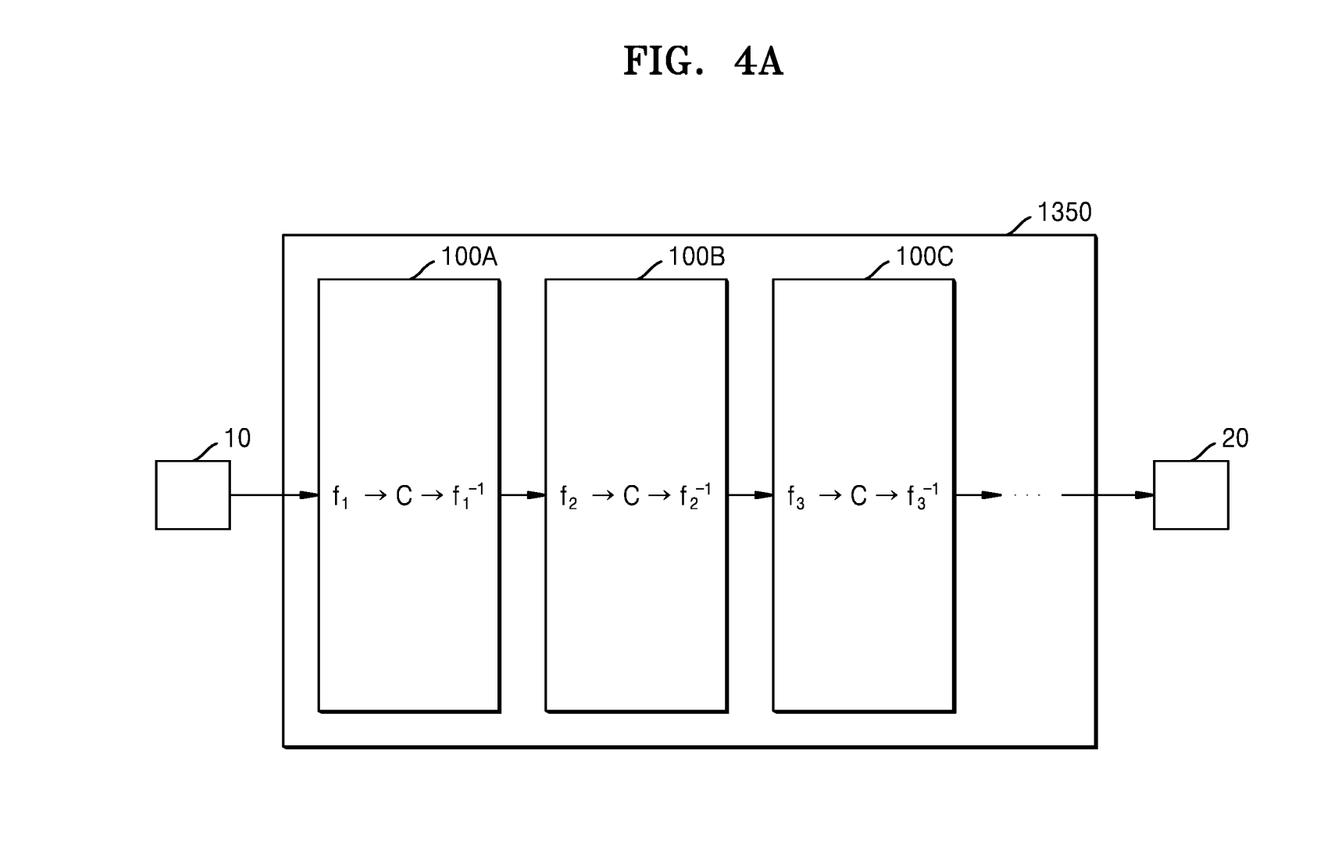
FIG. 4A illustrates a CNN according to an embodiment of the disclosure.

FIG. 4A illustrates a CNN according to an embodiment of the disclosure. For convenience of descriptions, the pooling layer 200 and the output layer 300 are omitted in FIG. 4A.

According to an embodiment of the disclosure, the plurality of spatial transformation modules 100 may include a same spatial transformation function. According to an embodiment of the disclosure, the plurality of spatial transformation modules 100 may include different spatial transformation functions. According to an embodiment of the disclosure, some of the plurality of spatial transformation modules 100 may include a same spatial transformation function, and the remaining thereof may include a spatial transformation function different from that of the some of the plurality of spatial transformation modules 100.

Referring to FIG. 4A, for example, the CNN 1350 may include a first spatial transformation module 100A including the spatial transformation function f1, a second spatial transformation module 100B including the spatial transformation function f2, and a third spatial transformation module 100C including the spatial transformation function f3. Here, the spatial transformation function f1, the spatial transformation function f2, and the spatial transformation function f3 may be a same function. Alternatively, the spatial transformation function f1, the spatial transformation function f2, and the spatial transformation function f3 may be different functions. Alternatively, the spatial transformation function f1 and the spatial transformation function f3 may be a same function, and the spatial transformation function f2 may be a different function from the spatial transformation function f1 and the spatial transformation function f3.

Figure 4B:
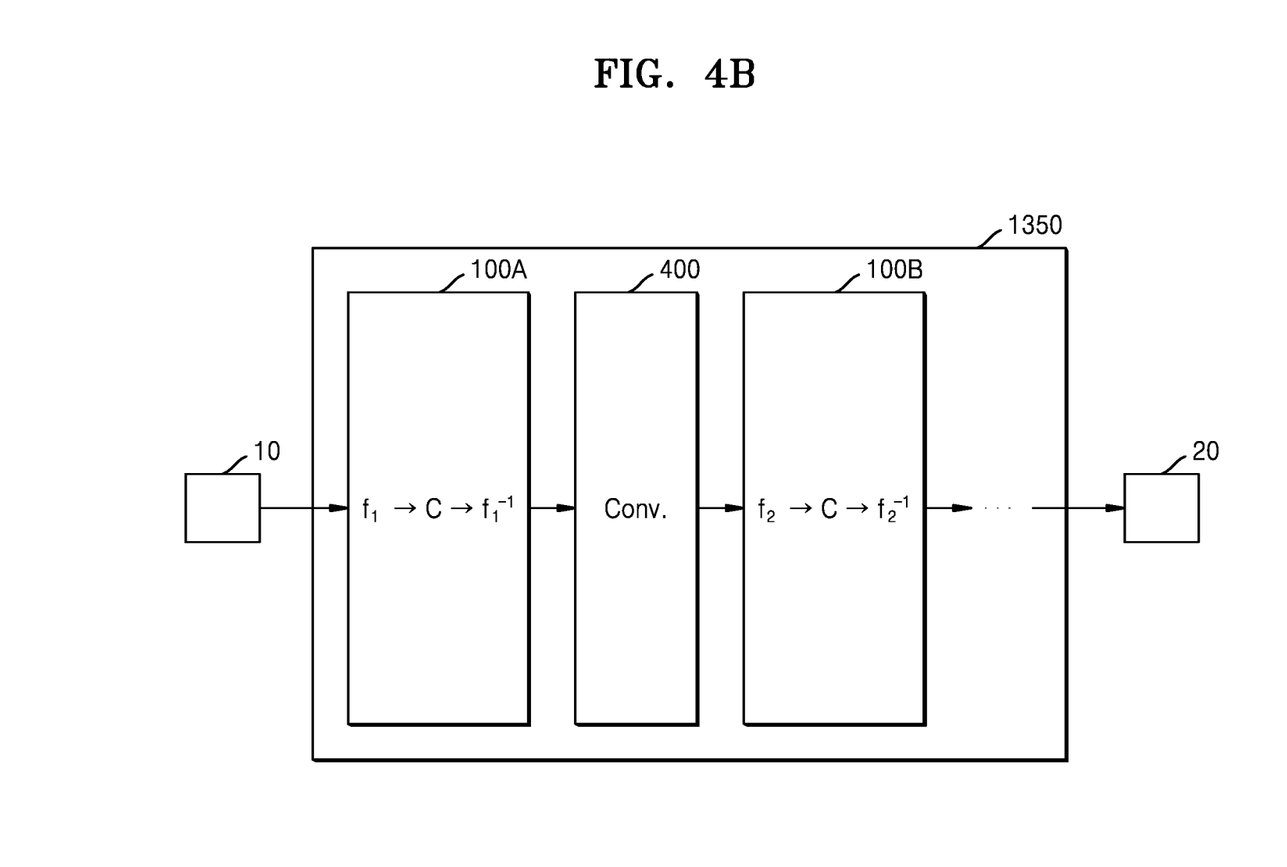
FIG. 4B illustrates a CNN according to an embodiment of the disclosure.

FIG. 4B illustrates a CNN according to an embodiment of the disclosure. For convenience of descriptions, the pooling layer 200 and the output layer 300 are omitted in FIG. 4B.

According to an embodiment of the disclosure, the CNN 1350 may further include a convolutional layer 400 configured to perform a convolution operation between input data that is the image 10 or an output of a previous spatial transformation module 100, and a filter. The convolutional layer 400 may be used together with the spatial transformation module 100. In other words, instead of all convolutional layers 120 and 400 included in the CNN 1350 learning spatially transformed input data, the convolutional layer 120 may learn spatially transformed input data and the convolutional layer 400 may learn input data that is not spatially transformed.

Referring to FIG. 4B, for example, the CNN 1350 may include the first spatial transformation module 100A including the spatial transformation function f1, the convolutional layer 400, and the second spatial transformation module 100B including the spatial transformation function f2. Here, the spatial transformation function f1 and the spatial transformation function f2 may be a same function or different functions. In FIG. 4B, the first spatial transformation module 100A is illustrated as a first layer of the CNN 1350, but the CNN 1350 is not limited thereto, and the convolutional layer 400 may be a first layer of the CNN 1350.

Figure 5:
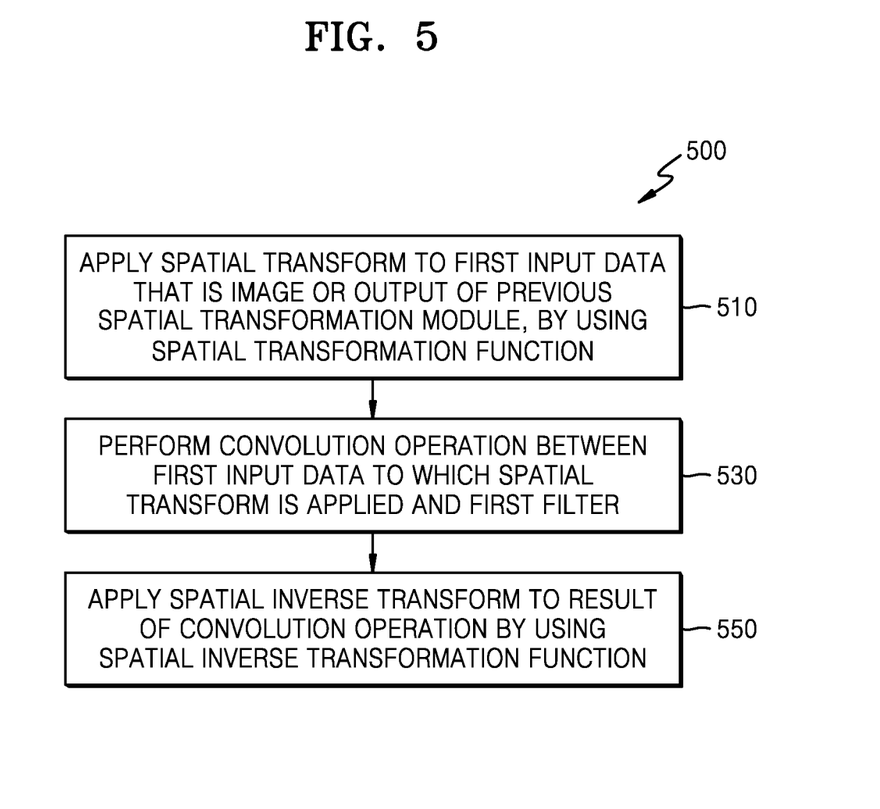
FIG. 5 is a flowchart of an image processing method according to an embodiment of the disclosure.

FIG. 5 is a flowchart of an image processing method according to an embodiment of the disclosure.

The image processing method 500 according to an embodiment of the disclosure may be performed by an apparatus (e.g., the image processing apparatus 1000 of FIG. 1) capable of driving the CNN 1350 including one or more spatial transformation modules 100.

Referring to FIG. 5, in operation 510, a first spatial transformation module among spatial transformation modules applies a spatial transform to first input data that is an image or an output of a previous spatial transformation module, by using a first spatial transformation function. In other words, in operation 510, spatial mapping of the first input data may be transformed by using the first spatial transformation function.

According to an embodiment of the disclosure, the first spatial transformation function may be a reversible function. The first spatial transformation function being reversible may indicate that a result of transforming the first input data has a same form as original first input data. Accordingly, whether the first spatial transformation function is reversible may be determined according to a form of the first input data.

In operation 530, the first spatial transformation module performs a convolution operation between the first input data to which the spatial transform is applied and a first filter.

In operation 550, the first spatial transformation module applies a spatial inverse transform to a result of the convolution operation by using a first spatial inverse transformation function. The first spatial inverse transformation function may be a reverse function of the first spatial transformation function. Operation 550 may be performed by performing operation 510 in reverse.

Figure 6:
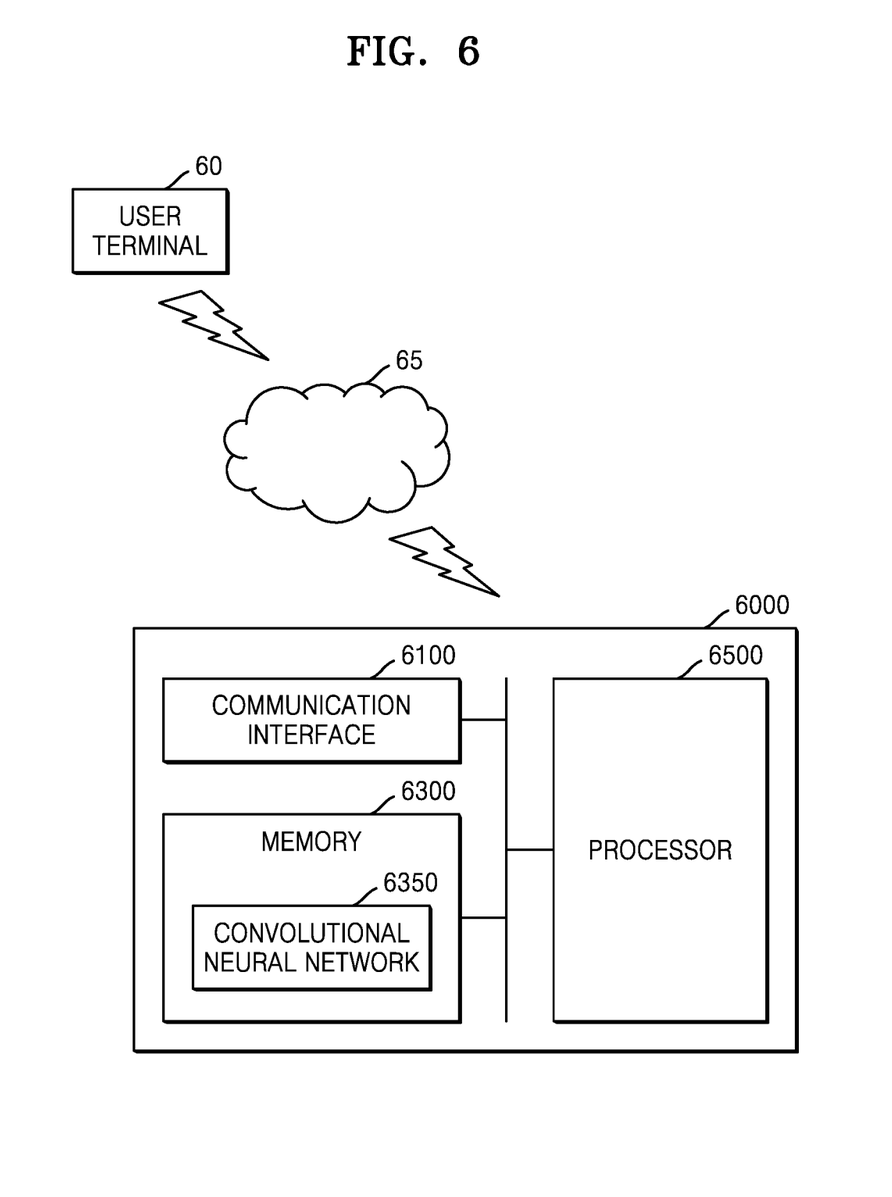
FIG. 6 is a block diagram of an image processing apparatus according to an embodiment of the disclosure.

FIG. 6 is a block diagram of an image processing apparatus according to an embodiment of the disclosure.

Referring to FIG. 6, the image processing apparatus 6000 according to an embodiment of the disclosure may include a communication interface 6100, a memory 6300, and a processor 6500.

The communication interface 6100 may communicate with a user terminal 60 through a network 65 under control by the processor 6500, receive an image from the user terminal 60, and transmit a processing result of the image to the user terminal 60.

For example, the communication interface 6100 may communicate with the user terminal 60 by using at least one of data communication methods including wired local area network (LAN), wireless LAN, Wi-Fi, Bluetooth, ZigBee, Wi-Fi direct (WFD), infrared data association (IrDA), Bluetooth low energy (BLE), near field communication (NFC), wireless broadband internet (WiBro), world interoperability for microwave access (WiMAX), shared wireless access protocol (SWAP), wireless gigabit alliance (WiGig), and radio frequency (RF) communication.

The memory 6300 may store one or more instructions for processing the image by using a CNN 6350.

The processor 6500 may execute the one or more instructions stored in the memory 6300 to process an image. The processor 6500 may process the image in a same manner as image processing of the processor 1500 described above.

A machine-readable storage medium may be provided in the form of a non-transitory storage medium. Here, the "non-transitory storage medium" only denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment of the disclosure, a method may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

According to an embodiment of the disclosure, an image processing apparatus using a convolutional neural network includes an input/output interface configured to receive an image and output a processing result for the image, a memory storing one or more instructions for processing the image by using the convolutional neural network, and a processor configured to process the image by executing the one or more instructions, wherein the convolutional neural network may include one or more spatial transformation modules.

According to an embodiment of the disclosure, each of the one or more spatial transformation module may include a spatial transformer configured to apply a spatial transform to first input data that is the image or an output of a previous spatial transformation module, by using a spatial transformation function.

According to an embodiment of the disclosure, each of the one or more spatial transformation module may include a first convolutional layer configured to perform a convolution operation between the first input data to which the spatial transform is applied and a first filter.

According to an embodiment of the disclosure, each of the one or more spatial transformation module may include a spatial inverse transformer configured to apply a spatial inverse transform to an output of the first convolutional layer by using a spatial inverse transformation function.

According to an embodiment of the disclosure, the one or more spatial transformation modules may include a first spatial transformation module and a second spatial transformation module, wherein a first spatial transformation function included in the first spatial transformation module and a second spatial transformation function included in the second spatial transformation module may be different from each other.

According to an embodiment of the disclosure, the spatial transformation function may be a reversible function.

According to an embodiment of the disclosure, whether the spatial transformation function is reversible may be determined according to a form of the first input data.

According to an embodiment of the disclosure, the spatial transformation function may be one of a permutation function, a rotation function, a flip function, or a scale function.

According to an embodiment of the disclosure, the convolutional neural network may further include a second convolutional layer configured to perform a convolution operation between a second input data that is the image or an output of a previous spatial transformation module, and a second filter.

According to an embodiment of the disclosure, the convolutional neural network may further include one or more pooling layers configured to perform sub sampling on an output of a previous layer or an output of a previous spatial transformation module.

According to an embodiment of the disclosure, the convolutional neural network may further include an output layer configured to calculate a processing result for the image by using an output of a previous layer.

According to an embodiment of the disclosure, the output layer may calculate a location of an object included in the image.

According to an embodiment of the disclosure, the output layer may calculate a type of an object included in the image.

According to an embodiment of the disclosure, the processing may include at least one of classification, detection, segmentation, or depth estimation performed on the image.

According to an embodiment of the disclosure, an image processing method using a convolutional neural network including one or more spatial transformation modules, includes, by a first spatial transformation module among the one or more spatial transformation modules, applying a spatial transform to first input data that is an image or an output of a previous spatial transformation module, by using a first spatial transformation function.

According to an embodiment of the disclosure, the image processing method may include performing a convolution operation between the first input data to which the spatial transform is applied and a first filter.

According to an embodiment of the disclosure, the image processing method may include applying a spatial inverse transform to a result of the convolution operation by using a first spatial inverse transformation function.

According to an embodiment of the disclosure, the image processing method may further include, by a second spatial transformation module among the one or more spatial transformation modules, applying a spatial transform to second input data that is an output of a previous spatial transformation module, by using a second spatial transformation function.

According to an embodiment of the disclosure, the image processing method may further include performing a convolution operation between the second input data to which the spatial transform is applied and a second filter.

According to an embodiment of the disclosure, the image processing method may further include applying a spatial inverse transform to a result of the convolution operation by using a second spatial inverse transformation function.

According to an embodiment of the disclosure, the second spatial transformation function may be different from the first spatial transformation function.

According to an embodiment of the disclosure, the first spatial transformation function and the second spatial transformation function may be reversible functions.

According to an embodiment of the disclosure, whether the first spatial transformation function is reversible may be determined according to a form of the first input data.

According to an embodiment of the disclosure, whether the second spatial transformation function is reversible may be determined according to a form of the second input data.

According to an embodiment of the disclosure, the first spatial transformation function and the second spatial transformation function may each be one of a permutation function, a rotation function, a flip function, or a scale function.

According to an embodiment of the disclosure, the image processing method may further include performing a convolution operation between the second filter and the second input data that is the image or an output of a previous spatial transformation module.

According to an embodiment of the disclosure, the image processing method may further include performing, by a pooling layer, sub sampling on an output of a previous layer or an output of a previous spatial transformation module.

According to an embodiment of the disclosure, the image processing method may further include calculating, by an output layer, a processing result for the image by using an output of a previous layer.

According to an embodiment of the disclosure, the output layer may calculate a location of an object included in the image.

According to an embodiment of the disclosure, the output layer may calculate a type of an object included in the image.

According to an embodiment of the disclosure, the processing may include at least one of classification, detection, segmentation, or depth estimation performed on the image.

The image processing method and apparatus, according to an embodiment of the disclosure, may secure robustness against rotation of an image by applying a spatial transformation function and a spatial inverse transformation between layers of a CNN.

The image processing method and apparatus, according to an embodiment of the disclosure, may have an increased recognition rate of a rotated image not only for classification, but also for an application that requires processing in units of pixels, such as detection, segmentation, or depth estimation, by transforming input data in each layer of a CNN and inverse-transforming a result of a convolution operation.

What is claimed is:

1. An image processing apparatus comprising:
   an input/output interface configured to receive an image and output a processing result for the image;
   a memory storing one or more instructions for processing the image by using a convolutional neural network; and
   a processor configured to process the image by executing the one or more instructions,
   wherein the convolutional neural network includes a plurality of spatial transformation modules,
   wherein the one or more instructions, when executed by the processor, cause the image processing apparatus to perform, by using a first spatial transformation module among the plurality of spatial transformation modules, the following operations:
   apply a spatial transform to first input data that is an image or an output of a previous spatial transformation module, by using a first spatial transformation function;

perform a convolution operation between the first input data to which the spatial transform is applied and a first filter; and
apply a spatial inverse transform to a result of the convolution operation by using a first spatial inverse transformation function, and
wherein the one or more instructions, when executed by the processor, cause the image processing apparatus to perform, by using a second spatial transformation module among the plurality of spatial transformation modules, the following operations:
apply a spatial transform to second input data that is an output of a previous spatial transformation module, by using a second spatial transformation function;
perform a convolution operation between the second input data to which the spatial transform is applied and a second filter; and
apply a spatial inverse transform to a result of the convolution operation by using a second spatial inverse transformation function,
wherein the second spatial transformation function is different from the first spatial transformation function.

2. The image processing apparatus of claim 1, wherein the first spatial transformation function and the second spatial transformation function are reversible functions.

3. The image processing apparatus of claim 2, wherein whether the first spatial transformation function is reversible is determined according to a form of the first input data, and
wherein whether the second spatial transformation function is reversible is determined according to a form of the second input data.

4. The image processing apparatus of claim 1, wherein the first spatial transformation function and the second spatial transformation function are each one of a permutation function, a rotation function, a flip function, or a scale function.

5. The image processing apparatus of claim 1, wherein the one or more instructions, when executed by the processor, cause the image processing apparatus to perform, by using a convolutional layer, a convolution operation between the second filter and the second input data that is the image or an output of a previous spatial transformation module.

6. The image processing apparatus of claim 1, wherein the one or more instructions, when executed by the processor, cause the image processing apparatus to:
perform, by using a pooling layer, sub sampling on an output of a previous layer or an output of a previous spatial transformation module; and
calculate, by using an output layer, a processing result for the image by using an output of a previous layer.

7. The image processing apparatus of claim 6, wherein the output layer calculates a location of an object included in the image.

8. The image processing apparatus of claim 6, wherein the output layer calculates a type of an object included in the image.

9. An image processing method using a convolutional neural network including a plurality of spatial transformation modules, the image processing method comprising:
by a first spatial transformation module among the plurality of spatial transformation modules:
applying a spatial transform to first input data that is an image or an output of a previous spatial transformation module, by using a first spatial transformation function;
performing a convolution operation between the first input data to which the spatial transform is applied and a first filter; and
applying a spatial inverse transform to a result of the convolution operation by using a first spatial inverse transformation function, and
by a second spatial transformation module among the plurality of spatial transformation modules:
applying a spatial transform to second input data that is an output of a previous spatial transformation module, by using a second spatial transformation function;
performing a convolution operation between the second input data to which the spatial transform is applied and a second filter; and
applying a spatial inverse transform to a result of the convolution operation by using a second spatial inverse transformation function,
wherein the second spatial transformation function is different from the first spatial transformation function.

10. The image processing method of claim 2, wherein the first spatial transformation function and the second spatial transformation function are reversible functions.

11. The image processing method of claim 10, wherein whether the first spatial transformation function is reversible is determined according to a form of the first input data, and
wherein whether the second spatial transformation function is reversible is determined according to a form of the second input data.

12. The image processing method of claim 9, wherein the first spatial transformation function and the second spatial transformation function are each one of a permutation function, a rotation function, a flip function, or a scale function.

13. The image processing method of claim 2, further comprising:
by a convolutional layer, performing a convolution operation between the second filter and the second input data that is the image or an output of a previous spatial transformation module.

14. The image processing method of claim 9, further comprising:
performing, by a pooling layer, sub sampling on an output of a previous layer or an output of a previous spatial transformation module; and
calculating, by an output layer, a processing result for the image by using an output of a previous layer.

15. The image processing method of claim 14, wherein the output layer calculates a location of an object included in the image.

16. The image processing method of claim 14, wherein the output layer calculates a type of an object included in the image.

17. The image processing method of claim 9, wherein the processing comprises at least one of classification, detection, segmentation, or depth estimation performed on the image.

18. A non-transitory computer-readable recording medium having recorded thereon a computer program for performing image processing operations, the operations comprising:
by a first spatial transformation module among a plurality of spatial transformation modules:

applying a spatial transform to first input data that is an image or an output of a previous spatial transformation module, by using a first spatial transformation function;

performing a convolution operation between the first input data to which the spatial transform is applied and a first filter; and applying a spatial inverse transform to a result of the convolution operation by using a first spatial inverse transformation function, and by a second spatial transformation module among the plurality of spatial transformation modules:

applying a spatial transform to second input data that is an output of a previous spatial transformation module, by using a second spatial transformation function;

performing a convolution operation between the second input data to which the spatial transform is applied and a second filter; and applying a spatial inverse transform to a result of the convolution operation by using a second spatial inverse transformation function, wherein the second spatial transformation function is different from the first spatial transformation function.

* * * * *